United States Patent Office 2,725,657
Patented Dec. 6, 1955

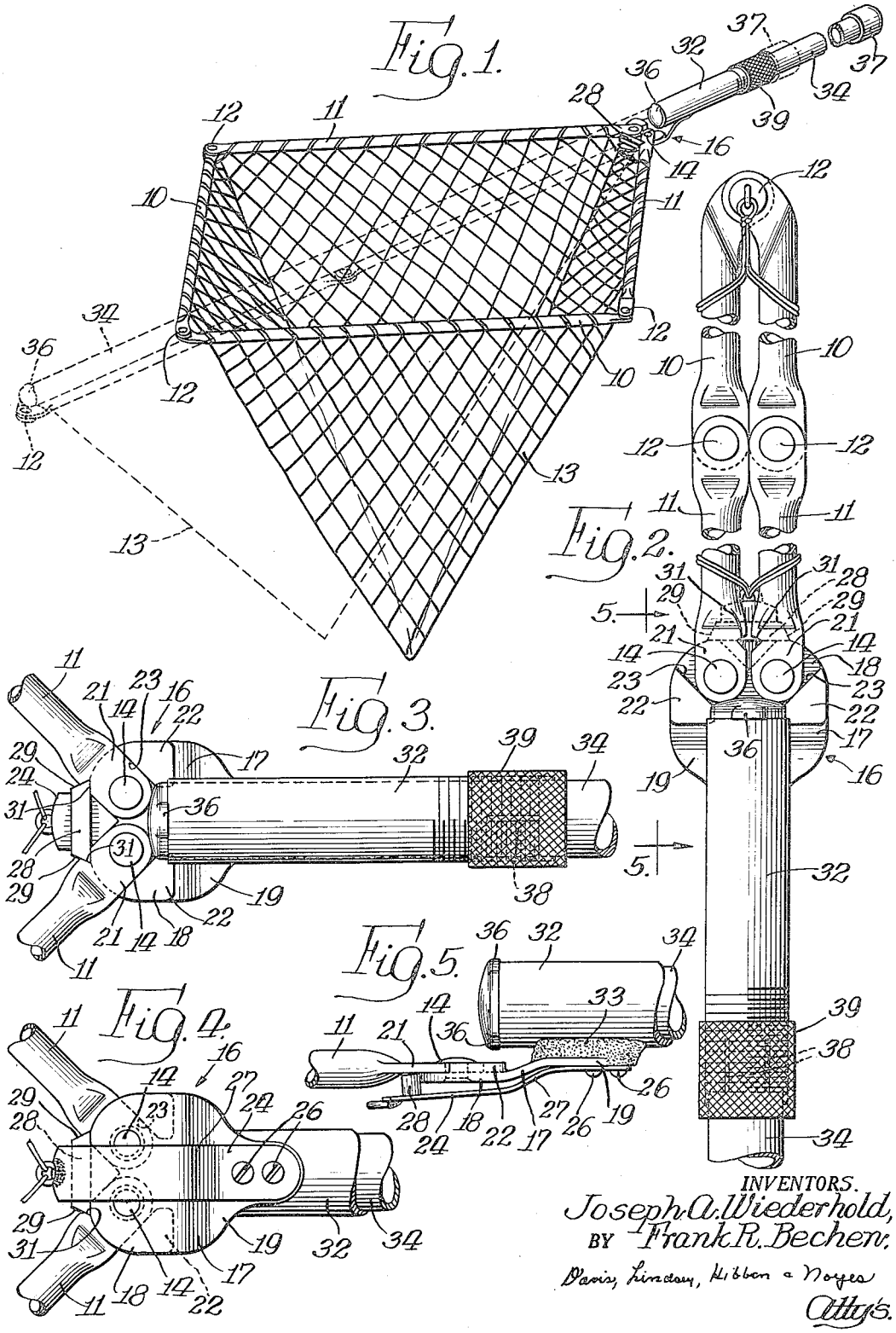

2,725,657

COLLAPSIBLE FISH NET

Joseph A. Wiederhold and Frank R. Bechen, Dubuque, Iowa

Application March 22, 1954, Serial No. 417,594

5 Claims. (Cl. 43—12)

This invention relates to improvements in collapsible nets such as fish nets or the like.

There have been various proposals heretofore for fish landing nets or the like wherein the net portion is collapsible and the handle portion is retractable or detachable in some fashion. However, we have found that there is still a definite need for a compact low cost net of this type, particularly one which can readily be made from light weight materials but can still be rigidly held in open position and can also be manipulated rapidly and conveniently during opening and closing.

Accordingly, a primary object of our invention is to provide a novel and improved collapsible or foldable net having substantial advantages over devices of this general character heretofore suggested.

A further object of the invention is to provide a collapsible net having novel releasable locking means for rigidly holding the net in open position.

Another object of the invention is to provide a collapsible net having a novel ararngement for mounting a retractable handle.

An additional object of the invention is to provide a collapsible net characterized by a novel combination of a locking means for holding the net open and a slidable handle mounting.

Other objects and advantages of the invention will become apparent from the subsequent detailed description taken in conjunction with the accompanying drawing, wherein:

Fig. 1 is a perspective view of a collapsible fish net comprising one specific embodiment of the invention, the device being illustrated in open or unfolded position in full lines and being shown in collapsed condition in broken lines;

Fig. 2 is an enlarged fragmentary top plan view of the major portions of the device with the net in collapsed or folded position;

Fig. 3 is a fragmentary top plan view of the device with the net in open position;

Fig. 4 is a bottom plan view of the portion of the device shown in Fig. 3; and

Fig. 5 is a fragmentary side elevational view, as seen along the line 5—5 of Fig. 2 and showing the operation of the locking means of the device.

Referring to the drawing, the device comprises two pairs of arms or bars 10 and 11 which are pivotally connected to each other as at 12, to form a rectangle or square when in open position as shown in full lines in Fig. 1. These bars 10 and 11 are preferably formed from a light weight tubular material such as aluminum tubing. A net 13 is suspended from the bars 10 and 11 and is collapsed or opened in accordance with pivotal closing and opening of the interconnected bars. The bars 11 are also pivotally connected, as at 14, to a central base or support member designated generally at 16.

The support member 16 is in the form of a unitary plate having a transverse bend 17 in order to provide a pair of parallel but relatively offset end portions 18 and 19.

For purposes of convenience, the flat end 19 will be referred to as the elevated portion of the support 16 and the opposite flat end 18 will be referred to as the depressed portion of the support 16. The inner ends of the bars 11 are flattened, as at 21, and are swingably secured to the upper side of the depressed end portion 18 of the support 16 by means of the pivot elements 14 extending through the flattened end portions 21 into the support portion 18. For limiting the extent of outward pivoting or opening movement of the bars 11, a pair of upright lugs or rigid abutments 22 are provided in spaced relation on the support portion 18 and have slanted edges 23 against which the outer sides of the flattened ends 21 of the bars 11 abut as seen in Fig. 3. Thus, the bars 11 are prevented from spreading beyond approximately a right angular or perpendicular relationship.

For holding the arms 11 in the spread apart or open position of Fig. 3, we provide a releasable spring lock means comprising an elongated resilient tongue 24 which is rigidly secured, as by a pair of screws 26, to the underside of the elevated support portion 19. The spring tongue 24 extends beyond the forward end of the support 16 and has an integral bent portion 27 for permitting the tongue to conform closely to the bent configuration of the support 16. At the outermost end of the tongue 24 a transverse wedge block or detent 28 is mounted and extends between the net-suspending bars 11. The opposite end portions of the detent 28 are angular or pointed, as at 29, and are adapted to interfit with or engage in a pair of cooperating notches 31 formed at the inner sides of the flattened end portions 21 of the bars 11. The resilient character of the elongated spring tongue 24 is such that the detent or block 28 is inherently held in locking relation with the pointed ends 29 engaged in the notches 31 so that the arms 11 are rigidly held in open position and in engagement with the abutments 22. For releasing the locking device to permit collapsing of the net, the spring tongue 24 can readily be depressed or deflected in the manner illustrated in Fig. 5 so that the block 28 is disengaged from the arms 11 and thereby permitting the net-suspending arms to be folded in parallel side-by-side collapsed relation.

On the uppermost side of the elevated support portion 19 a tubular member or mounting sleeve 32 is rigidly fastened, as by welding at 33. An elongated handle 34, which is also preferably of light weight tubular metal such as aluminum, is slidably disposed in the mounting sleeve 32 with a pair of radially extending flanges or lugs 36 being provided at one end of the handle 34 and an enlarged diameter cap member 37 of rubber or the like being provided at the opposite end of the handle 34 for preventing detachment of the handle 34 from the sleeve 32 in extreme positions of the handle. As will be apparent, particularly from Fig. 1, the handle member 34 can be shifted forwardly into retracted position overlying the folded net-suspending bars 10 and 11 and it can also be shifted rearwardly to extended position for normal usage of the net. The outer end of the mounting sleeve 32 has a plurality of longitudinal slits 38, and a knurled collar 39 is threaded onto the split end of the sleeve 32. The split end of the sleeve 32 and the collar 39 have coacting tapered portions so that the handle 34 can be clamped in any desired position longitudinally of the sleeve 32 merely by tightening the collar 39 to provide a wedging action. Likewise, by loosening the knurled collar 39, the handle 34 is freed and can be shifted rapidly and conveniently into retracted position.

An important feature of the invention is the offset construction of the support 16 with the handle mounting sleeve 32 being mounted on one portion of the base member and the net-suspending arms 11 being pivotally mounted on the other portion of the base member so that the handle 34 can be slid back and forth between retracted and extended positions without interference with the net-supporting arms. In other words, the offset construction of the support 16 provides the necessary clearance so that the handle 34 can be moved into overlying parallel relation with the foldable net-suspending arms 10 and 11. Thus, the device is collapsed to a handy compact form with the retracted handle 34 having approximately the same length as the folded net and the attached support 16 and sleeve 32.

From the foregoing, it will be evident that our invention permits a relatively inexpensive and light weight construction while at the same time affording a compact and rapidly manipulatable arrangement. Moreover, in spite of the light weight collapsible construction, the net can be rigidly locked in open position for withstanding relatively severe usage.

Although the invention has been described with particular reference to a specific structural embodiment thereof, it is to be understood that various modifications and equivalent structures may be resorted to without departing from the scope of the invention as defined in the appended claims.

We claim:

1. In a collapsible net having a plurality of pivotally connected foldable arms with a net suspended therefrom, a support having parallel offset mounting portions, a pair of said net-suspending arms being pivotally attached to one of said portions, said arms being swingable between spread-apart and folded side-by-side positions, a tubular sleeve rigidly attached to the other of said portions, an elongated handle slidably mounted in said sleeve for movement between retracted and extended positions relative to the net, stop means adjacent the ends of said handle engageable with said sleeve for limiting the extent of sliding movement of the handle, and locking means coacting with said handle for retaining the handle in extended position, the offset relation of said mounting portions affording clearance to permit said handle to overlie said arms when the handle is in retracted position.

2. The device of claim 1 further characterized in that said locking means comprises axially split portions at one end of said sleeve and a tightening collar surrounding the handle and sleeve and threadedly attached to the latter.

3. In a collapsible net having a plurality of pivotally connected foldable arms with a net suspended therefrom, a support plate having integral parallel offset portions at the opposite ends of the plate, a pair of said net-suspending arms being pivotally attached to one offset portion on said plate at one side thereof, an elongated spring tongue rigidly secured at one end thereof to the other offset portion of said plate at the opposite side thereof, said tongue having releasable locking means at its opposite end engageable with said arms for holding the latter in spread-apart open position, a tubular handle-mounting sleeve rigidly secured to said other offset portion of said plate at said one side thereof, and an elongated handle slidably disposed in said sleeve, the offset relation of said tubular member with respect to said arms thereby permitting free sliding movement of the handle into retracted position overlying said arms.

4. The device of claim 3 further characterized in that said tongue fits closely adjacent said opposite side of said plate.

5. In a collapsible net having a plurality of pivotally connected foldable arms with a net suspended therefrom, a support having a mounting portion, a pair of said net-suspending arms being pivotally attached to said mounting portion and said arms being swingable between spread-apart and folded side-by-side positions, an elongated resilient tongue secured at one end thereof to said support, detent means at the other end of said tongue engageable with said arms for releasably holding the latter in spread-apart relation, handle supporting means on said support in offset relation to said mounting portion, and an elongated handle disposed in said handle supporting means adapted for movement between retracted and extended positions, said offset relation affording clearance to permit said handle to overlie said arms when the handle is in retracted position.

References Cited in the file of this patent

UNITED STATES PATENTS

| 1,450,322 | McElhany | Apr. 3, 1923 |

FOREIGN PATENTS

| 5,865 | Great Britain | 1888 |
| 23,093 | Great Britain | 1911 |
| 54,800 | France | Aug. 1, 1950 |
| 623,933 | Great Britain | May 25, 1949 |
| 846,284 | France | Sept. 13, 1939 |